(12) United States Patent
Jade

(10) Patent No.: US 10,635,516 B2
(45) Date of Patent: Apr. 28, 2020

(54) INTELLIGENT LOGGING

(71) Applicant: Trend Micro Incorporated, Tokyo (JP)

(72) Inventor: Mahesh Dinkar Jade, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 136 days.

(21) Appl. No.: 15/879,172

(22) Filed: Jan. 24, 2018

(65) Prior Publication Data

US 2018/0150346 A1 May 31, 2018

Related U.S. Application Data

(63) Continuation of application No. PCT/US2015/044752, filed on Aug. 12, 2015.

(51) Int. Cl.
*G06F 11/07* (2006.01)
*G06F 11/34* (2006.01)
*G06F 11/30* (2006.01)

(52) U.S. Cl.
CPC ........ *G06F 11/0754* (2013.01); *G06F 11/079* (2013.01); *G06F 11/0721* (2013.01); *G06F 11/3024* (2013.01); *G06F 11/3466* (2013.01); *G06F 11/3476* (2013.01); *G06F 2201/81* (2013.01); *G06F 2201/865* (2013.01)

(58) Field of Classification Search
CPC ............... G06F 11/3636; G06F 11/366; G06F 11/0754; G06F 11/079; G06F 11/3024; G06F 11/3466; G06F 11/3476; G06F 2201/81; G06F 2201/865
See application file for complete search history.

(56) References Cited

U.S. PATENT DOCUMENTS

| 7,120,685 | B2 * | 10/2006 | Ullmann | G06F 11/0709 |
| | | | | 709/224 |
| 7,661,032 | B2 * | 2/2010 | Eberbach | G06F 11/008 |
| | | | | 707/686 |
| 7,827,447 | B2 * | 11/2010 | Eberbach | G06F 11/004 |
| | | | | 714/45 |
| 8,949,195 | B1 * | 2/2015 | Lekkalapudi | G06F 16/345 |
| | | | | 707/672 |
| 9,535,981 | B2 * | 1/2017 | Basak | G06F 16/335 |
| 9,742,624 | B2 * | 8/2017 | Hanckel | H04L 41/069 |
| 2006/0174165 | A1 | 8/2006 | Shaffer et al. | |
| 2008/0168242 | A1 * | 7/2008 | Eberbach | G06F 11/004 |
| | | | | 711/161 |

(Continued)

FOREIGN PATENT DOCUMENTS

WO 2004-100639 A2 11/2004

*Primary Examiner* — Nadeem Iqbal
(74) *Attorney, Agent, or Firm* — Okamoto & Benedicto LLP

(57) ABSTRACT

Examples relate to intelligent logging in a system. One example enables monitoring a set of critical processes of the system, responsive to a first process parameter of a first critical process exceeding a corresponding first parameter threshold, changing a first process log level associated with the critical process from a first log level to a second log level; and logging information related to the first critical process by: obtaining a second set of information associated with the second log level, wherein the second set of information is different from a first set of information associated with the first log level.

12 Claims, 2 Drawing Sheets

(56) References Cited

U.S. PATENT DOCUMENTS

| | | | |
|---|---|---|---|
| 2008/0243848 A1* | 10/2008 | Vedula | G06F 16/9535 |
| 2010/0257408 A1 | 10/2010 | Bartels et al. | |
| 2014/0279918 A1* | 9/2014 | Han | G06F 11/366 |
| | | | 707/648 |
| 2014/0373018 A1 | 12/2014 | Liu et al. | |
| 2015/0205696 A1* | 7/2015 | Hanckel | G06F 11/3476 |
| | | | 714/45 |
| 2015/0207709 A1* | 7/2015 | Hanckel | H04L 41/069 |
| | | | 709/224 |

* cited by examiner

INTELLIGENT LOGGING

CROSS-REFERENCE TO RELATED APPLICATION

This application is a continuation of International Application No. PCT/US2015/044752, with an International Filing Date of Aug. 12, 2015, which is incorporated herein by reference in its entirety.

BACKGROUND

Systems monitor and log information related to content, processes running in the system, and/or other data related to operation of the system. This log data may be used for various purpose include, for example, to determine the state of the system and to perform root cause analysis responsive to an error occurring in the system.

BRIEF DESCRIPTION OF THE DRAWINGS

The following detailed description references the drawings, wherein.

DETAILED DESCRIPTION

Figure 1:
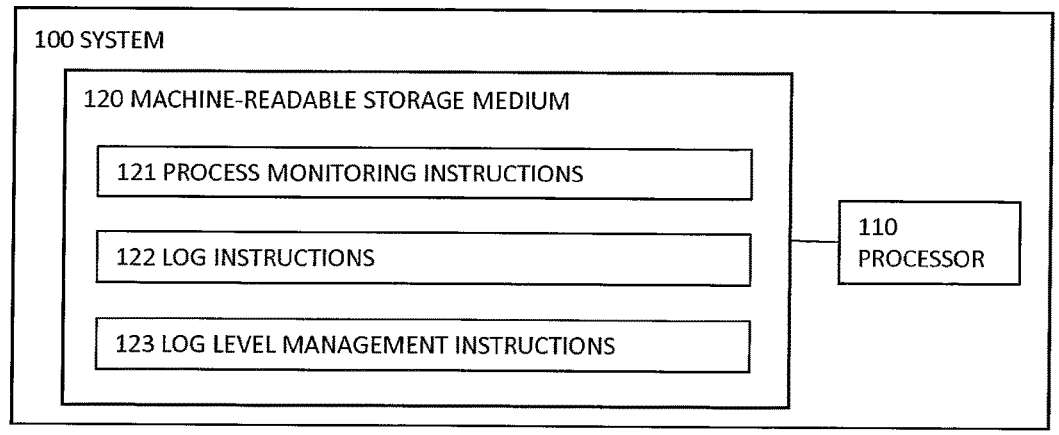
FIG. 1 is a block diagram of an example system for intelligent logging.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As mentioned above, systems monitor and log information related to content, processes running in the system, resources of the system, and/or other data related to operation of the system. This log data may be used for various purpose include, for example, to determine the state of the system and to perform root cause analysis responsive to an error occurring in the system.

Systems general use static logging levels that are determined at compile time or set by an administrator to log information about the system. If the system becomes unhealthy or stops operating, the logs obtained by the system may be changed to obtain additional information. At this point, however, the additional information may not be useful for root cause analysis, as the problems that cause the system to become unhealthy or stop operating have already occurred.

A new technical solution to this challenge involves intelligent logging. In particular, an example system that uses intelligent logging has dynamic logging capabilities that allow different levels of logging to be automatically initiated without operator intervention, software patches, or other external activity.

An example computer system implementing intelligent logging may monitor operation of critical processes running in the system and may change a level of logging used for an individual critical process or for an application based on operation of that critical process. The critical processes may be processes of an application, an operating system, etc.

The system may determine the set of critical processes to monitor based on information stored in a non-transitory machine readable storage medium of the system. In some examples, the system may determine the set of critical process to monitor based on information stored in a configuration file that is stored in the non-transitory machine readable storage medium. The non-transitory machine readable storage medium may also store information about multiple levels of logging, and the information to be obtained at each logging level. The storage medium may also store information associating each critical process with a respective logging level. In some examples, the storage medium (or another non-transitory machine readable storage medium communicably coupled to the system) may store the information obtained responsive to the system monitoring and logging information about the critical processes.

In addition to obtaining log data, the system may monitor the set of critical processes. In particular, the system may monitor a set of process parameters for each critical process. Responsive to a first process parameter of a first critical process exceeding a corresponding first parameter threshold, the system may change a first process log level associated with the first critical process from a first log level to a second log level and may log information related to the first critical process by obtaining a second set of information associated with the second log level.

Referring now to the drawings, FIG. 1 is a block diagram of an example system 100 for intelligent logging. In the example depicted in FIG. 1, system 100 includes a non-transitory machine-readable storage medium 120 and a processor 110.

Referring now to the drawings, FIG. 1 is a block diagram of an example system 100 for intelligent logging. System 100 may comprise a cloud server, a mainframe, notebook, desktop, tablet, workstation, mobile device, and/or any other device suitable for executing the functionality described below. In the embodiment of FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, and/or other instructions to enable intelligent logging, as described below. As an alternative or in addition to retrieving and executing instructions, processor 110 may include one or more electronic circuits comprising a number of electronic components for performing the functionality of one or more of instructions 121, 122, 123, and/or other instructions.

In one example, the program instructions 121, 122, 123, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Non-transitory machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for intelligent logging. As detailed below, storage medium 120 may maintain and/or store the data and information described herein.

For example, storage medium 120 may maintain and/or store data and information related to intelligent logging. Storage medium 120 may store, for example, log information obtained by the logging performed by the system 100. Storage medium 120 may also store information about the critical processes to monitor. The information about the critical processes to monitor may include, for example, process name, process log level (e.g., a log level currently associated with the critical process), a set of process parameters associated with the critical process, a set of parameter thresholds corresponding to the set of process parameters, a set of log levels to be used for logging information related to the critical process, and/or other information about the critical process.

In an example of an intrusion protection system, the set of critical processes may comprise, for example, a traffic monitoring process, a process which routes all packets to a fast path, a process used for inter-process communications, a process that monitors hardware system health, and/or other processes that are integral to the functionality of the intrusion protection system.

In some examples, the set of process parameters associated with a critical process may be the same for each critical process to be monitored by the system 100. In some examples, a default set of process parameters may be used for each critical process (and/or may at least be initially used for each critical process). For example, the default set of process parameters may comprise a number of child processes spawned from the critical process, a number of threads running for a critical process, an amount of physical memory used by the critical process, and/or an amount of virtual memory used by the critical process. The process parameters may comprise other parameters related to the performance of the critical process as well and are not limited to the examples described herein.

In some examples, each critical process may be associated with its own set of process parameters. In some of these examples, the respective sets of process parameters may each be a subset of the default set of process parameters.

In some examples, the set of parameter thresholds associated with the set of process parameters may be the same for each critical process. In some examples, a default set of parameter thresholds may be used for each process parameter (and/or may at least be initially used for each process parameter. For example, a first parameter threshold associated with a number of child processes spawned from a critical process may be the same across each critical process. In some examples, the parameter thresholds may be customized for each critical process. For example, each critical process may have a different first parameter threshold associated with the number of child processes spawned from the critical process.

Each parameter threshold may also be associated with a log level. In some examples, a default set of log levels may be associated with the default set of parameter thresholds in a one-to-one relationship. In some examples, each parameter threshold may be associated with a distinct log level.

Responsive to a process parameter exceeding a corresponding parameter threshold, the log level associated with that parameter threshold may be used for logging information related to the critical process. In some examples, each process parameter may be associated with a tier of parameter thresholds, such that, each parameter threshold in the tier may be associated with a distinct log level.

In some examples, a set of process parameters may be an ordered set of process parameters. As such, the process parameters may be considered in an ordered priority by the system 100. Responsive to a first process parameter exceeding a corresponding first parameter threshold, the system may no longer compare process parameters set forth later in the ordered set. A log level associated with the exceeded first parameter threshold may be the determined log level for the critical process. In other examples, the set of process parameters may be considered as a whole, and the exceeding of multiple sets of parameters may be taken into account when determining a log level for the critical process.

The storage medium 120 may also store associations between critical processes and log level. In some examples, each critical process may be associated with a corresponding set of log levels and may be associated with a process log level at which information about the critical process is currently to be obtained. The set of log levels may be the same across each critical process or may be customized for each critical process. As mentioned above, each parameter threshold may be associated with a log level. The log level associated with each parameter threshold (and corresponding process parameter) may be the same across each critical process or may be different for each critical process.

In some examples, a log level may be associated with information from some or all of the parameter processes of a critical process. As such, instead of being associated with a single parameter threshold, a log level may be associated with a set of parameter thresholds. For example, a first log level may be associated with no process parameters exceeding their corresponding thresholds, while a second log level may be associated with a first process parameter exceeding a first parameter threshold and a second process parameter exceeding a second parameter threshold, and a third log level may be associated with only the second process parameter exceeding its second parameter threshold. Other examples of log level associations may be used as well and log level associations are not limited to the examples described herein.

The storage medium 120 may also store information about each log level used to obtain information about a critical process. For each log level, the storage medium 120 may store information related to a log level identifier, a set of information to be obtained responsive to a critical process being associated with that log level, and/or other information related to the log level.

Process monitoring instructions 121, when executed by processor 110, may monitor a set of critical processes. The process monitoring instructions 121, when executed by processor 110, may monitor the set of critical processes for an application, operating system, hardware component executing machine readable instructions, etc. The process monitoring instructions 121, when executed by processor 110, may determine the set of critical processes to monitor based on information stored in the storage medium 120. In some examples, the information stored in the storage medium 120 related to the set of critical processes may be provided by an administrator of the system 100, by an administrator of the application, may be machine-learned, and/or may be otherwise determined and stored.

In some examples, the process monitoring instructions 121, when executed by processor 110, may determine the set of critical processes to monitor based on a configuration file stored in the storage medium 120. The configuration file may comprise information about each critical process and about processes dependent on the critical processes. The information in the configuration file may be provided by an administrator of the system 100, by an application developer, may be machine-learned, and/or may be otherwise determined and stored. In some examples, responsive to receiving information about the critical processes and responsive to the system 100 being in a healthy state, the process monitoring instructions 121, when executed by processor 110, may determine information about the dependent processes (e.g., processes upon which the critical process relies upon to execute, and/or other dependent processes). The process monitoring instructions 121, when executed by processor 110, may store the information about the dependent processes in the configuration file. The system 100 may also store information related to a default set of process parameters, default set of parameter thresholds, and default set of logging levels for each dependent process. The system 100 may treat each process in the configuration file as a critical process.

For each critical process, the process monitoring instructions 121, when executed by processor 110, may monitor a set of process parameters. The process monitoring instructions 121, when executed by processor 110, may determine the set of process parameters to monitor for a critical process based on information stored in the storage medium 120. In some examples, the process monitoring instructions 121, when executed by processor 110, may determine the set of process parameters to monitor based on the configuration file stored in the storage medium 120. In some examples, the process monitoring instructions 121, when executed by processor 110, may monitor the set of process parameters by determining values associated with each of the process parameters and by storing those values in the storage medium 120.

In some examples, the log instructions 122, when executed by processor 110, may log additional information related to applications being executed on the system 100, hardware of the system 100, and/or other information related to the system 100. In some examples, log instructions 122, when executed by processor 110, may also log information related to each critical process. For example, the log instructions 122, when executed by processor 110, may log and store information related to a critical process by obtaining a set of information associated with a log level associated with the critical process. In some examples, the log instructions 122, when executed by processor 110, may determine the log level at which to obtain information for a critical process based on the executed log level management instructions 123.

In some examples, the log level management instructions 123, when executed by processor 110, may determine a log level of a critical process. For example, the log level management instructions 123, when executed by processor 110, may determine a first process log level of a first critical process as a first log level. The log level management instructions 123, when executed by processor 110, may determine a log level of a critical process by obtaining information related to the critical process from the storage medium 120. In some examples, the log level management instructions 123, when executed by processor 110, may determine the log level of a critical process from a configuration file stored in the storage medium 120.

The log level management instructions 123, when executed by processor 110, may determine whether a set of process parameter of a critical process exceeds a corresponding set of parameter thresholds for the critical process. For example, for each process parameter of the set of process parameters for a critical process, the log level management instructions 123, when executed by processor 110, may determine whether a value associated with that parameter a corresponding parameter threshold. The log level management instructions 123, when executed by processor 110, may obtain the value associated with that parameter from a log associated with the critical process, may determine the value by pinging resources of the system 100, and/or may otherwise determine the value. The log level management instructions 123, when executed by processor 110, may determine a value associated with the corresponding parameter threshold from the storage medium 120. In some examples, the log level management instructions 123, when executed by processor 110, may obtain the value associated with the parameter threshold from a configuration file stored in the storage medium 120.

The log level management instructions 123, when executed by processor 110, may change a log level of a critical process. For example, responsive to determining that a process parameter of the set of process parameters exceeds a corresponding parameter threshold fora critical process, the log level management instructions 123, when executed by processor 110, may change a log level associated with the critical process from a first log level to a second log level. The log level management instructions 123, when executed by processor 110, may determine whether to change a log level of a critical process based on whether one or more process parameters of the set of process parameters for that critical process exceeds corresponding parameter thresholds.

As mentioned above, in some examples, a set of process parameters may be an ordered set of process parameters. As such, the process parameters may be considered in an ordered priority by the system 100. Responsive to a first process parameter exceeding a corresponding first parameter threshold, the log level management instructions 123, when executed by processor 110, may no longer compare process parameters set forth later in the ordered set. The log level management instructions 123, when executed by processor 110, may determine the log level for the critical process as the log level associated with the exceeded first parameter threshold. In other examples, the set of process parameters may be considered as a whole, and the log level management instructions 123, when executed by processor 110, may consider each of the process parameters that were exceeded in determining a log level for the critical process.

Responsive to determining a new log level for the critical process, the log level management instructions 123, when executed by processor 110, may change the log level for the process. For example, the log level management instructions 123, when executed by processor 110, may update an association in the storage medium 120 (and/or the configuration file stored in the storage medium 120) to associate the determined log level with the critical process.

In some examples, the log level management instructions 123, when executed by processor 110, may change the log level responsive to a process parameter (or set of process parameters) exceeding a corresponding parameter threshold (or set of parameter thresholds) for a predetermined time period.

The log level management instructions 123, when executed by processor 110, may also change a log level responsive to determining that a process parameter (or set of process parameters) is no longer exceeding a corresponding parameter threshold (or set of parameter thresholds). In some examples, the log level management instructions 123, when executed by processor 110, may also change a log level responsive to determining that a process parameter (or set of process parameters) is no longer exceeding a corresponding parameter threshold (or set of parameter thresholds) for the predetermined time period.

The log level management instructions 123, when executed by processor 110, may determine the predetermined time period based on information stored in the storage medium 120. In some examples, the predetermined time period may be set by a system administrator, application developer, and/or other entity. In some examples, the predetermined time period may be learned by the system.

In some examples, the log level management instructions 123, when executed by processor 110, may change a log level for a critical process responsive to an error being called based on the logging performed by the system. For example, the system 100 may also comprise a set of log APIs (application programming interfaces) which may be implemented to determine whether any critical error conditions are met. Responsive to a critical error condition being met, the system 100 may cause the log API to produce an error. In these examples, responsive to the critical condition being changed/removed, the log level management instructions 123, when executed by processor 110, may change the log level to a prior log level.

Responsive to changing the log level for a critical process, the log level management instructions 123, when executed by processor 110, may cause the system 100 to log information related to the critical process and/or an application, operating system, etc., associated with the critical process at the changed log level.

The system 100 may perform this functionality for each critical process being monitored by the system 100 in a concurrent and/or parallel process. The system 100 may perform this functionality while also performing logging functionality for the critical processes and/or for other resources of the system 100.

Figure 2:
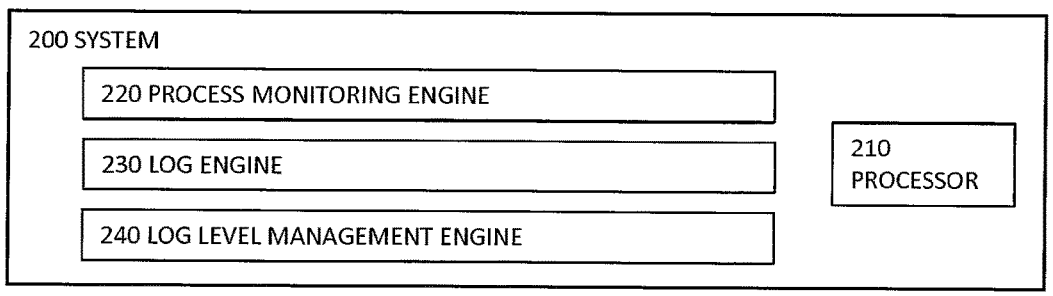
FIG. 2 is a block diagram of an example system for intelligent logging.

FIG. 2 is a block diagram of an example system 200 for intelligent logging. As with system 100, system 200 may comprise a cloud server, a mainframe, notebook, desktop, tablet, workstation, mobile device, and/or any other device suitable for executing the functionality described below. As with processor 110 of FIG. 1, processor 210 may be one or more CPUs, microprocessors, and/or other hardware devices suitable for retrieval and execution of instructions. The non-transitory machine readable storage of FIG. 2 may be the same as or similar to the storage medium 120 of FIG. 1. Non-transitory machine-readable storage medium of FIG. 2 may store information related to the critical processes being monitored by the system 200, log levels, a configuration file, and/or other information related to intelligent logging for system 200. In some examples, the information stored by non-transitory machine-readable storage medium may be the same as or similar to information stored by non-transitory machine-readable storage medium 120

As detailed below, system 200 may include a series of engines 220-240 for intelligent logging. Each of the engines may generally represent any combination of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described below.

Process monitoring engine 220 may monitor a set of critical processes in the system. In some examples, the process monitoring engine 220 may monitor the set of critical processes in a manner the same as or similar to that of the process monitoring instructions 122 of system 100. Further details regarding an example implementation of process monitoring engine 220 are provided above in connection with process monitoring instructions 121 of FIG. 1.

Log engine 230 may log information related to each critical process. In some examples, the log engine 230 may log information related to each critical process in a manner the same as or similar to that of the log instructions 122 of system 100. Further details regarding an example implementation of log engine 230 are provided above in connection with log instructions 122 of FIG. 1.

Log level management engine 240 may change a log level associated with a critical process from a first log level to a second log level responsive to determining that a process parameter of the critical process exceeded a corresponding parameter threshold. In some examples, the log level management engine 240 may change a log level associated with a critical process in a manner the same as or similar to that of the system 100. Further details regarding an example implementation of log level management engine 240 are provided above in connection with log level management instructions 123 of FIG. 1.

Figure 3:
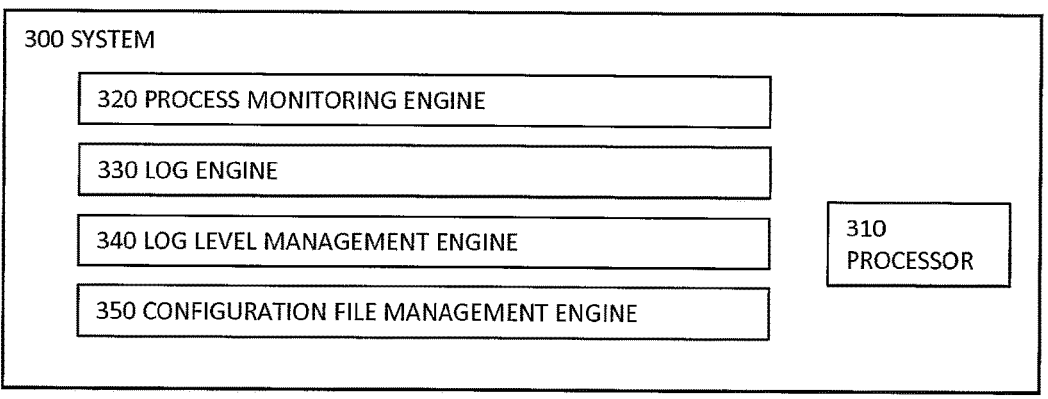
FIG. 3 is a block diagram of an example system for intelligent logging.

FIG. 3 is a block diagram of an example system for intelligent logging. As illustrated in FIG. 3 and described below, system 300 may comprise a processor 310, a non-transitory machine readable storage medium, a series of engines 320-360 for intelligent logging, and/or other components.

As with processor 110 of FIG. 1, processor 310 may be one or more CPUs, microprocessors, and/or other hardware devices suitable for retrieval and execution of instructions. As with machine-readable storage medium 120, non-transitory machine-readable storage medium may be any hardware storage device for maintaining data accessible to system 300. As with engines 220-240, engines 330-350 may generally represent any combination of hardware and programming.

Non-transitory machine-readable storage medium of FIG. 3 may be the same as or similar to the storage medium 120 of FIG. 1. Non-transitory machine-readable storage medium of FIG. 3 may store information related to the critical processes being monitored by the system 300, log levels, a configuration file, and/or other information related to intelligent logging for system 300. In some examples, the information stored by non-transitory machine-readable storage medium may be the same as or similar to information stored by non-transitory machine-readable storage medium 120

Process monitoring engine 320 may perform functionality the same as or similar to that of the process monitoring engine 220 of system 200. Further details regarding an example implementation of process monitoring engine 320 are provided above in connection with process monitoring engine 220 of system 200.

Log engine 330 may perform functionality the same as or similar to that of the log engine 230 of FIG. 2. Further details regarding an example implementation of log engine 330 are provided above in connection with log engine 230 of FIG. 2.

Log level management engine 340 may perform functionality the same as or similar to that of the log level management engine 240 of FIG. 2. Further details regarding an example implementation of log level management engine 340 are provided above in connection with log level management engine 240 of FIG. 2.

Configuration file management engine 350 may manage a configuration file used by system 300 for intelligent logging. For example, configuration file management engine 350 may facilitate creation, updating, storage, and/or other management of the configuration file. The configuration file may comprise information related to a set of critical processes to be monitored by system 300. The set of critical processes may comprise an initial set of critical processes and a set of process dependencies for each critical process of the initial set of critical processes. In some examples, the configuration file management engine 350 may receive information related to the initial set of critical processes and corresponding sets of processes dependencies from a system administrator, application developer, and/or other entity. In some examples, the configuration file management engine 350 may receive information related to the initial set of critical processes and may determine a set of process dependencies for each critical process in the initial set of critical processes. In these examples, the configuration file management engine 350 may store information related to the sets of process dependencies in the configuration file.

In some examples, the configuration file may also include, for each critical process, information related to a set of process parameters, a corresponding set of parameter thresholds, and a corresponding set of log levels. In examples in which the configuration file management engine 350 determines the sets of process dependencies, the configuration file management engine 350 may associate each process dependency with a default set of process parameters, default set of parameter thresholds, and default set of log levels.

The configuration file management engine 350 may store the configuration file in the storage medium 320. Further details regarding an example implementation of configuration file management engine 350 are provided above in connection with process monitoring instructions 121 of FIG. 1.

System 300 may perform other functionality related to intelligent logging as well and is not limited to the examples of intelligent logging functionality described herein.

Figure 4:
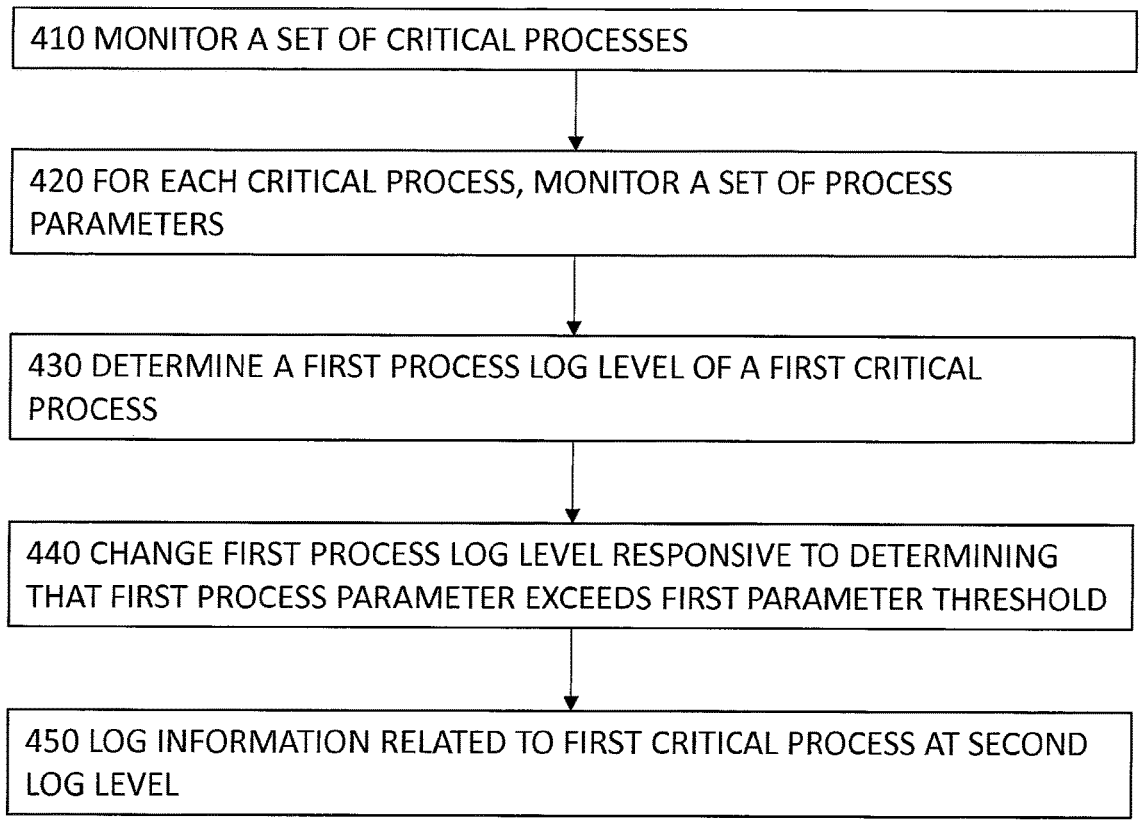
FIG. 4 is a flowchart of an example method for intelligent logging device.

FIG. 4 is a flowchart of an example method for execution by a computing device for intelligent logging.

Although execution of the methods described below are with reference to system 100 of FIG. 1 system 200 of FIG. 2, and/or system 300 of FIG. 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 400, a set of critical processes may be monitored. For example, the system 100 (and/or the process monitoring instructions 121, the process monitoring engine 220, or other resource of the system 100) may monitor the set of critical processes. The system 100 may monitor the set of critical processes in a manner similar or the same as that described above in relation to the execution of the process monitoring instructions 121, the process monitoring engine 220, and/or other resource of the system 100.

In an operation 410, a set of process parameters may be monitored for each critical process. For example, the system 100 (and/or the process monitoring instructions 121, the process monitoring engine 220, or other resource of the system 100) may monitor a set of process parameters for each critical process. The system 100 may monitor a set of process parameters for each critical process in a manner similar or the same as that described above in relation to the execution of the process monitoring instructions 121, the process monitoring engine 220, or other resource of the system 100.

In an operation 420, a first process log level of a first critical process may be determined as a first log level. For example, the system 100 (and/or the log level management instructions 123, the log level management engine 240, or other resource of the system 100) may determine that the first process log level of a first critical process is a first log level. The system 100 may determine the first process log level of the first critical process as a first log level in a manner similar or the same as that described above in relation to the execution of the log level management instructions 123, the log level management engine 240, or other resource of the system 100.

In an operation 430, information related to the first critical process may be logged by obtaining a first set of information associated with the first log level. For example, the system 100 (and/or the log instructions 122, log engine 230, or other resource of the system 100) may log information related to the first critical process by obtaining the first set of information associated with the first log level. The system 100 may log information related to the first critical process by obtaining the first set of information associated with the first log level in a manner similar or the same as that described above in relation to the execution of the log instructions 122, log engine 230 of the system 100.

In an operation 440, responsive to determining that a first process parameter of a first set of process parameters associated with the first critical process exceeds a corresponding first parameter threshold, the first process log level associated with the first critical process is changed from the first log level to a second log level. For example, the system 100 (and/or the log level management instructions 123, the log level management engine 240, or other resource of the system 100) may change the first process log level associated with the first critical process. The system 100 may change the first process log level associated with the first critical process in a manner similar or the same as that described above in relation to the execution of the log level management instructions 123, the log level management engine 240, or other resource of the system 100.

In an operation 450, information related to the first critical process may be logged by obtaining a second set of information associated with the second log level. For example, the system 100 (and/or the log instructions 122, log engine 230, or other resource of the system 100) may log information related to the first critical process by obtaining the second set of information associated with the second log level. The system 100 may log information related to the first critical process by obtaining the second set of information associated with the second log level in a manner similar or the same as that described above in relation to the execution of the log instructions 122, log engine 230 of the system 100.

Figure 5:
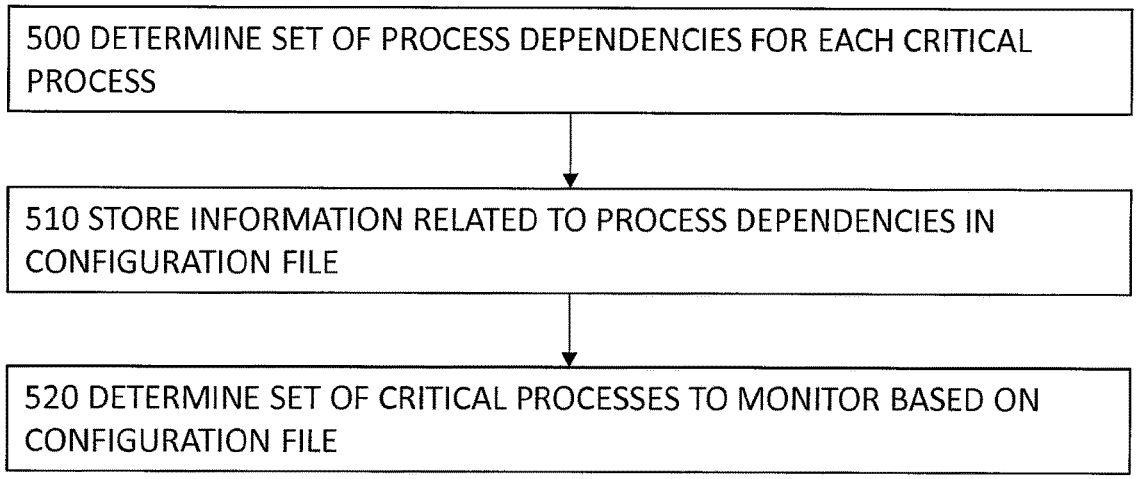
FIG. 5 is a flowchart of an example method for intelligent logging device.

FIG. 5 is a flowchart of an example method for execution by a computing device for determining a set of processes to monitor for intelligent logging.

In an operation 500, for each critical process, a set of process dependencies may be monitored. For example, the system 100 (and/or the process monitoring instructions 121, the process monitoring engine 220, or other resource of the system 100) may determine the set of process dependencies. The system 100 may determine the set of process dependencies in a manner similar or the same as that described above in relation to the execution of the process monitoring instructions 121, the process monitoring engine 220, and/or other resource of the system 100.

In an operation 510, information related to the process dependencies may be stored in a configuration file. For example, the system 100 (and/or configuration file management engine 350, or other resource of the system 300) may store information related to the process dependencies in the configuration file. The system 100 may store information related to the process dependencies in the configuration file in a manner similar or the same as that described above in relation to the execution of the and/or configuration file management engine 350, or other resource of the system 300.

In an operation 520, a set of critical processes to monitor may be determined based on the configuration file. For example, the system 100 (and/or the process monitoring instructions 121, the process monitoring engine 220, configuration file management engine 350, or other resource of the system 100) may determine the set of critical processes to monitor. The system 100 may determine the set of critical processes to monitor in a manner similar or the same as that described above in relation to the execution of the process monitoring instructions 121, the process monitoring engine 220, configuration file management engine 350, and/or other resource of the system 100.

The foregoing disclosure describes a number of example embodiments for intelligent logging. The disclosed examples may include systems, devices, computer-readable storage media, and methods for intelligent logging. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

I claim:

1. A system for intelligent logging, the system comprising:
a physical processor implementing machine readable instructions stored on a non-transitory machine-readable storage medium that cause the system to:
monitor a set of critical processes of the system;
responsive to a first process parameter of a first critical process exceeding a corresponding first parameter threshold, change a first process log level associated with the critical process from a first log level to a second log level; and
log information related to the first critical process by: obtaining a second set of information associated with the second log level, wherein the second set of information is different from a first set of information associated with the first log level,
wherein the physical processor implements machine readable instructions that cause the system to monitor the first critical process by:
monitoring a first set of process parameters, the first set of process parameters comprising the first process parameter,
wherein the first set of process parameters comprise at least one of: a number of threads used by the first critical process, a number of child processes spawned from the first critical process, an amount of virtual memory used by the first critical process, or an amount of physical memory used by the first critical process.

2. The system of claim 1, wherein the physical processor implements machine readable instructions that cause the system to:
responsive to the first process parameter no longer exceeding the first parameter threshold, change the first process log level associated with the first critical process from the second log level to the first log level; and
log information related to the first critical process by obtaining the first set of information associated with the first log level.

3. The system of claim 1, wherein the physical processor implements machine readable instructions that cause the system to:
monitor each critical process of the set of critical processes by monitoring a corresponding set of process parameters for each critical process.

4. The system of claim 1, wherein the physical processor implements machine readable instructions that cause the system to:
log information related to a second critical process of the set of critical processes by obtaining a third set of information associated with a third log level associated with the second critical process.

5. The system of claim 4, wherein the first log level and the third log level may be used responsive to determining that the first set of process parameters has not been exceeded and a second set of process parameters for the second process has not been exceeded.

6. The system of claim 1, wherein the physical processor implements machine readable instructions that cause the system to:
responsive to a third process parameter of the first critical process exceeding a third parameter threshold, change the first process log level associated with the first critical process from the second log level to a third log level; and
log information related to the first critical process by obtaining a third set of information associated with the third log level, wherein the third set of information associated with the third log level is different from the first set of information associated with the first log level or the second set of information associated with the second log level.

7. The system of claim 1, wherein the physical processor implements machine readable instructions that cause the system to determine the set of critical processes to monitor based on a configuration file, wherein the configuration file comprises:
information related to the set of critical processes; and
for the first critical process, information related to a set of first process dependencies.

8. The system of claim 7, wherein the physical processor implements machine readable instructions that cause the system to:
determine the set of first process dependencies for the first critical process; and
include information related to the set of first process dependencies in the configuration file.

9. A method for intelligent logging in a system, the system comprising a physical processor implementing computer readable instructions, the method comprising:
monitoring, by the processor, a set of critical processes;
for each critical process, monitoring, by the processor, a set of process parameters;
determining, by the processor, a first process log level of a first critical process as a first log level;
logging, by the processor, information related to the first critical process by obtaining a first set of information associated with the first log level;
responsive to determining that a first process parameter of a first set of process parameters associated with the first critical process exceeds a corresponding first parameter threshold, changing, by the processor, the first process log level associated with the first critical process from the first log level to a second log level; and
logging, by the processor, information related to the first critical process by obtaining a second set of information associated with the second log level, wherein the second set of information associated with the second log level is different from the first set of information associated with the first log level,
wherein the set of process parameters comprise at least one of: a number of threads used by the first critical process, a number of child processes spawned from the first critical process, an amount of virtual memory used by the first critical process, or an amount of physical memory used by the first critical process.

10. The method of claim 9, further comprising:
responsive to the first process parameter no longer exceeding the first parameter threshold, changing, by the processor, the first process log level associated with the first critical process from the second log level to the first log level; and
logging, by the processor, information related to the first critical process by obtaining the first set of information associated with the first log level.

11. The method of claim 9, further comprising:
logging, by the processor, information related to a second critical process of the set of critical processes by obtaining a fourth set of information associated with a fourth log level associated with the second critical process.

12. The method of claim 9, further comprising
determining, by the processor, the set of critical processes to monitor based on a configuration file, wherein the configuration file comprises:
information related to the set of critical processes; and
for the first critical process, information related to a set of first process dependencies.

* * * * *